(12) United States Patent
Xiong et al.

(10) Patent No.: US 11,378,758 B2
(45) Date of Patent: Jul. 5, 2022

(54) OPTICAL FIBER SUB-ASSEMBLY AND OPTICAL FIBER CONNECTOR

(71) Applicant: Huawei Technologies Co., Ltd., Shenzhen (CN)

(72) Inventors: Wei Xiong, Dongguan (CN); Xiupeng Li, Wuhan (CN); Wenxin Wu, Shenzhen (CN); Jianxiong Yu, Wuhan (CN); Dan Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/983,102

(22) Filed: Aug. 3, 2020

(65) Prior Publication Data

US 2020/0363593 A1    Nov. 19, 2020

Related U.S. Application Data

(63) Continuation of application No. PCT/CN2019/104255, filed on Sep. 3, 2019.

(30) Foreign Application Priority Data

Sep. 3, 2018 (CN) .......................... 201811028827.8

(51) Int. Cl.
*G02B 6/38* (2006.01)

(52) U.S. Cl.
CPC ......... *G02B 6/3874* (2013.01); *G02B 6/3825* (2013.01); *G02B 6/3831* (2013.01); *G02B 6/3849* (2013.01); *G02B 6/3866* (2013.01); *G02B 6/3887* (2013.01)

(58) Field of Classification Search
CPC .. G02B 6/3874; G02B 6/3825; G02B 6/3849; G02B 6/3887; G02B 6/3866
USPC .......................................................... 385/78
See application file for complete search history.

(56) References Cited

U.S. PATENT DOCUMENTS

| 4,762,388 | A | | 8/1988 | Tanaka et al. | |
|---|---|---|---|---|---|
| 5,478,970 | A | * | 12/1995 | Lawler | E21B 17/023 174/74 R |
| 5,732,175 | A | * | 3/1998 | Fan | G02B 6/3821 385/66 |
| 5,799,122 | A | | 8/1998 | Jeong et al. | |
| 6,151,432 | A | * | 11/2000 | Nakajima | G02B 6/3831 385/55 |

(Continued)

FOREIGN PATENT DOCUMENTS

| CA | 3038832 A1 | 4/2018 |
|---|---|---|
| CN | 201017071 Y | 2/2008 |

(Continued)

*Primary Examiner* — Kaveh C Kianni
(74) *Attorney, Agent, or Firm* — Conley Rose, P.C.

(57) ABSTRACT

An optical fiber sub-assembly and an optical fiber connector, where the optical fiber sub-assembly includes a connector component, where a first end of the connector component is used to connect an optical cable, and where a ferrule is disposed at a second end of the connector component. Additionally, a protection tube is disposed around the ferrule, where an end surface of the ferrule protrudes from an end surface of the protection tube or an end surface of the ferrule is level with an end surface of the protection tube. Further, the protection tube has a notch, and a beveled edge is formed at an outer end of the notch.

19 Claims, 8 Drawing Sheets

(56) References Cited

U.S. PATENT DOCUMENTS

| | | | |
|---|---|---|---|
| 6,505,975 B2 | 1/2003 | Asada et al. | |
| 7,467,896 B2 * | 12/2008 | Melton | G02B 6/4429 385/87 |
| 7,708,469 B2 * | 5/2010 | Liu | G02B 6/3833 385/66 |
| 9,091,825 B2 * | 7/2015 | Takahashi | G02B 6/3833 |
| 9,395,499 B2 * | 7/2016 | Huang | G02B 6/3821 |
| 2002/0061171 A1 | 5/2002 | Asada | |
| 2009/0304335 A1 * | 12/2009 | Marcouiller | G02B 6/3869 385/78 |
| 2011/0280521 A1 * | 11/2011 | Kachmar | G02B 6/3821 385/78 |
| 2015/0260926 A1 * | 9/2015 | Wu | G02B 6/3825 385/60 |
| 2016/0349460 A1 | 12/2016 | Collier et al. | |
| 2017/0219780 A1 * | 8/2017 | Griffiths | G02B 6/3887 |
| 2017/0235064 A1 * | 8/2017 | Griffiths | G02B 6/3894 385/78 |
| 2017/0299817 A1 | 10/2017 | Huang et al. | |
| 2019/0227244 A1 | 7/2019 | Huang et al. | |

FOREIGN PATENT DOCUMENTS

| | | |
|---|---|---|
| CN | 103840274 A | 6/2014 |
| CN | 107656339 A | 2/2018 |
| CN | 207096505 U | 3/2018 |
| CN | 105917259 B | 4/2018 |
| CN | 108318975 A | 7/2018 |
| CN | 109188611 A | 1/2019 |
| EP | 3495862 A1 | 6/2019 |
| JP | 2002156558 A | 5/2002 |
| JP | 2015537255 A | 12/2015 |
| JP | 2018040820 A | 3/2018 |
| WO | 2018025337 A1 | 2/2018 |
| WO | 2018058508 A1 | 4/2018 |

* cited by examiner

OPTICAL FIBER SUB-ASSEMBLY AND OPTICAL FIBER CONNECTOR

CROSS-REFERENCE TO RELATED APPLICATIONS

This application is a continuation of International Patent Application No. PCT/CN2019/104255, filed on Sep. 3, 2019, which claims priority to Chinese Patent Application No. 201811028827.8, filed on Sep. 3, 2018. The disclosures of the aforementioned applications are hereby incorporated by reference in their entireties.

TECHNICAL FIELD

This application relates to the field of optical communications technologies, and in particular, to an optical fiber sub-assembly and an optical fiber connector.

BACKGROUND

As modern society develops and information amount grows explosively, people need increasingly high network throughput capability. Due to exclusive features such as ultra-high bandwidth and low electromagnetic interference, optical transmission gradually becomes a mainstream solution of modern communication. Particularly, networks newly established at present, for example, access networks represented by fiber to the home (FTTH) are currently deployed on a large scale.

In construction of a fiber to the home network, there needs to be sequentially an optical feeder cable, an optical distribution cable, and an optical drop cable between an optical line terminal (OLT) and a fiber access terminal box (ATB) of a user. The optical drop cable is used to connect a fiber division box and the fiber access terminal box. In a process of laying the optical drop cable in the FTTH network, one approach is splicing. To be specific, optical fiber terminals corresponding to all homes are distributed in the fiber division box. An optical fiber terminal and one end of an optical drop cable of each home are spliced in a fiber division box using an optical fiber splicer, and the optical drop cable is then laid to the home. The other end of the optical drop cable also needs to be spliced on site to connect the optical drop cable to a fiber access terminal box of the home. For this approach, a dedicated optical fiber splicing device is required, an operator needs to be adequately skilled, and it takes a relatively long time to lay an entire optical drop cable. In another approach, field mountable connector products are used. To be specific, an optical fiber in a distribution optical cable to be connected is terminated first and is connected to one end of an adapter in a fiber division box. During connection, a user fabricates a connector on site to terminate an optical drop cable and connects the optical drop cable to the other end of the adapter to implement user connection. The optical drop cable is then laid to a home. A field mountable connector is also installed at the other end of the optical drop cable to connect the optical drop cable to a customer splicing point of the home. A splicer is omitted in this approach. However, a field mountable connector has problems such as high insertion loss (0.3 decibels (dB) to 0.5 dB) and low reliability.

A fiber connectorization product may desirably resolve the foregoing problem. Connectorization means that an optical drop cable is terminated in a factory. To be specific, optical fiber sub-assembles are made at two ends of the optical drop cable, and optical, mechanical, and environmental performance are tested. Matching optical fiber adapters are made at a corresponding fiber division box and a corresponding customer splicing point. In a process of laying an optical drop cable, it is only necessary to insert optical fiber sub-assemblies at two ends of the optical drop cable into optical fiber adapters on a corresponding fiber division box and a corresponding customer splicing point. A fiber connectorization product may minimize damage or safety hazards caused to fiber links by various uncertainties in design, construction, and use of optical fiber networks, to fully ensure system safety and satisfy design requirements and reduce a required time and devices during on-site field construction.

An existing optical fiber sub-assembly usually includes a connector. One end of the connector is connected to the optical drop cable, a ferrule is disposed at the other end of the connector, and a protection tube is disposed around the ferrule. An end surface of the ferrule does not protrude from an end surface of the protection tube to protect the ferrule. However, during connection of an optical fiber sub-assembly and an adapter, because the ferrule is completely blocked by the protection tube, it is highly difficult to align the ferrule with a jack of the adapter in an operation of inserting the ferrule into the jack of the adapter. As a result, the operation is time consuming. Moreover, the ferrule is subject to repeated impact during repeated incorrect insertion, and the ferrule is easily susceptible to damage.

SUMMARY

Embodiments of this application provide an optical fiber sub-assembly and an optical fiber connector, to help align a ferrule of an optical fiber sub-assembly with a jack of an adapter, improve connection efficiency, and protect the ferrule from damages.

To achieve the foregoing objective, the following technical solutions are used in the embodiments of this application.

According to a first aspect, this application provides an optical fiber sub-assembly. The optical fiber sub-assembly includes a connector component, where a first end of the connector component is used to connect an optical cable, while a ferrule is disposed at a second end of the connector component, and a protection tube is disposed around the ferrule. Additionally, an end surface of the ferrule protrudes from an end surface of the protection tube or an end surface of the ferrule is level with an end surface of the protection tube.

In the optical fiber sub-assembly provided in this embodiment of this application, because the end surface of the ferrule protrudes from the end surface of the protection tube or the end surface of the ferrule is level with the end surface of the protection tube in the optical fiber sub-assembly, a position of the ferrule is visible to an operator during connection of the optical fiber sub-assembly and an adapter, to help align the ferrule with a jack of the adapter. This way, a success rate of insertion is increased, and the ferrule is protected from repeated impact due to incorrect insertion and is therefore protected from damages. The ferrule needs to be regularly or irregularly cleaned during routine use of the optical fiber sub-assembly. Therefore, as the end surface of the ferrule protrudes from the end surface of the protection tube or the end surface of the ferrule is level with the end surface of the protection tube, an operation of cleaning the ferrule can be further facilitated.

In a possible implementation, a locking cap is sleeved over the connector component, and the locking cap is used to connect the adapter. In this way, connection positions of the optical fiber sub-assembly and the adapter may be protected, thereby protecting an optical fiber connector from damages caused by an external environment.

In a possible implementation, a connecting key is disposed on a wall of an inner hole of the locking cap, which is able to rotate with respect to the connector component. Further, a spring is disposed between the connector component and the locking cap.

In a possible implementation, the connector component includes a ferrule connecting member, a connecting shaft, and an optical cable fixing apparatus. The ferrule is disposed at one end of the ferrule connecting member. The other end of the ferrule connecting member is connected to the connecting shaft, one end, away from the ferrule connecting member, of the connecting shaft is connected to the optical cable fixing apparatus, which is used to fix the optical cable. Further, a through hole extending in an axial direction is provided in the connecting shaft, where the through hole is used for a cable core of the optical cable to pass through, and the cable core passes through the through hole to be connected to the ferrule at the ferrule connecting member.

In a possible implementation, the locking cap is sleeved over the connecting shaft, an axial shoulder is formed on an outer wall of the connecting shaft, and a boss is formed on an inner wall of the locking cap. One end of the spring abuts against the axial shoulder, and the other end of the spring abuts against the boss. In the structure, the spring may be positioned and installed without using an additional component, such that an assembly operation is convenient.

In a possible implementation, a sealing ring is disposed between the locking cap and the connecting shaft, to prevent foreign objects such as moisture and dust from entering the optical fiber connector through a connection between the locking cap and the connecting shaft, to reach ingress protection level 68 (IP68).

In a possible implementation, symmetrical flattened planes are formed on side walls of the locking cap, to facilitate holding and prevent a slip when the locking cap is operated to rotate.

In a possible implementation, anti-slip grooves are formed in the flattened plane, to further increase friction and improve the hand feel during operation.

In a possible implementation, the optical cable fixing apparatus includes a rear retainer, a heat shrink tubing, and a crimping structure. The heat shrink tubing is sleeved over the optical cable, the crimping structure is used to rivet an aramid yarn layer of the optical cable and the connecting shaft together, and the rear retainer is sleeved over the heat shrink tubing and is connected to the end, away from the ferrule connecting member, of the connecting shaft. In this way, an optical cable at a tail end of the optical fiber sub-assembly can be effectively fixed, and tensile strength and sealing performance of the optical fiber sub-assembly can be improved.

In a possible implementation, a locating slot is provided in a side wall of the connecting shaft, a snap ring is disposed in the locating slot, and the rear retainer is clamped to the snap ring. In this way, the rear retainer can be prevented from moving in an axial direction.

In a possible implementation, a first dust-proof cap is detachably connected to the second end of the connector component. In this way, before the optical fiber sub-assembly is inserted into the adapter, dustproofness and waterproofness can be provided, and the ferrule can be protected.

In a possible implementation, the protection tube has a notch.

In a possible implementation, a beveled edge is formed at an outer end of the notch.

In a possible implementation, a height difference between the end surface of the ferrule and the end surface of the protection tube is between 0 millimeters (mm) and 0.5 mm. When the height difference is within the foregoing range, a position of the ferrule can be readily visible to an operator and the ferrule can be effectively protected.

According to a second aspect, an embodiment of this application further provides an adapter, where a jack and an annular slot provided around the jack are disposed at a first end of the adapter.

In a possible implementation of the second aspect, a rotation locking slot is provided in a side wall of the adapter, where the rotation locking slot includes an axial section extending in an axial direction and a circumferential section extending in a circumferential direction. An opening is formed at an outer end of the axial section, an inner end of the axial section is in communication with the circumferential section, and an extending portion extending towards the first end of the adapter is formed at one end of the circumferential section.

In a possible implementation of the second aspect, a separating rib is formed in the annular slot.

In a possible implementation of the second aspect, a second dust-proof cap is detachably connected to the first end of the adapter, a nut is connected at a second end of the adapter through a thread, and a flange is disposed on the side wall of the adapter. Additionally, a sealing ring is disposed between the flange and the nut, and the sealing ring is connected to the second dust-proof cap through a string. In this way, before the adapter is used, dustproofness and waterproofness can be provided.

In a possible implementation of the second aspect, there are a plurality of rotation locking slots, and the plurality of rotation locking slots are uniformly distributed along a circumference of the adapter.

According to a third aspect, an embodiment of this application further provides an optical fiber connector. The optical fiber connector includes: an optical fiber sub-assembly, where the optical fiber sub-assembly is the foregoing optical fiber sub-assembly in any implementation of the first aspect; and an adapter, where the adapter is the foregoing adapter in any implementation of the second aspect, where a ferrule of the optical fiber sub-assembly is inserted into a jack of the adapter. Further, a protection tube of the optical fiber sub-assembly is correspondingly inserted into an annular slot.

In the optical fiber connector provided in this embodiment of this application, an end surface of the ferrule protrudes from an end surface of the protection tube in the optical fiber sub-assembly. Therefore, a position of the ferrule is visible to an operator during connection of the optical fiber sub-assembly and the adapter, to help align the ferrule with the jack of the adapter, a success rate of insertion is increased. Additionally, the ferrule is protected from repeated impact due to incorrect insertion and is therefore protected from damages. The ferrule needs to be regularly or irregularly cleaned during routine use of the optical fiber sub-assembly. Therefore, as the end surface of the ferrule protrudes from the end surface of the protection tube or the end surface of the ferrule is level with the end surface of the protection tube, an operation of cleaning the ferrule can be further facilitated.

In a possible implementation of the third aspect, a locking cap is sleeved over the connector component, and the locking cap is clamped at the adapter. In this way, connection positions of the optical fiber sub-assembly and the adapter may be protected, thereby protecting the optical fiber connector from damages caused by an external environment.

In a possible implementation of the third aspect, the locking cap is able to rotate with respect to the connector component, a connecting key is disposed on a wall of an inner hole of the locking cap, and a spring is disposed between the connector component and the locking cap. Additionally, a rotation locking slot is provided in a side wall of the adapter. The rotation locking slot includes an axial section extending in an axial direction and a circumferential section extending in a circumferential direction, where an opening is formed at an outer end of the axial section. An inner end of the axial section is in communication with the circumferential section, an extending portion extending towards a first end of the adapter is formed at one end of the circumferential section, the inner hole of the locking cap is sheathed over the adapter, the connecting key is clamped in the extending portion, and an elastic force of the spring can prevent the connecting key from coming off the extending portion. In this way, during assembly of the optical fiber sub-assembly and the adapter, after the ferrule is inserted into the jack of the adapter, the connecting key merely needs to be rotated into an end extension portion of the rotation locking slot, in a time-saving and labor-saving manner due to no repeated rotation. Moreover, because the spring is disposed between the connector component and the locking cap, under the elastic force of the spring, the connecting key can be tightly clamped at the end extension portion of the rotation locking slot. In this way, the optical fiber sub-assembly and the adapter do not get loosened even under long-time vibration, ensuring long-term reliability of the optical fiber connector.

In a possible implementation of the third aspect, the protection tube has a notch, and a separating rib is formed at a position, corresponding to the notch, in the annular slot. When the protection tube is inserted into the annular slot, the separating rib is correspondingly inserted into the notch. In this way, the separating rib can prevent the protection tube from rotating, to prevent the connector component from rotating with respect to the adapter.

In a possible implementation of the third aspect, a beveled edge is formed at an outer end of the notch. In this way, even if the separating rib is not aligned with the center of the notch, the separating rib can be guided by the beveled edge to slide into the notch, to facilitate an assembly operation.

In a possible implementation of the third aspect, there are a plurality of connecting keys and a plurality of rotation locking slots. The plurality of connecting keys and the plurality of rotation locking slots are clamped in a one-to-one correspondence manner. In this way, a locking force can be distributed more uniformly, to prevent the optical fiber sub-assembly from coming off the adapter.

In a possible implementation of the third aspect, an indication mark is disposed on an outer wall of the locking cap. When the indication mark is aligned with the notch of the protection tube, relative positions of the notch of the protection tube and the connecting key on the locking cap adapt to relative positions of the separating rib on the adapter and the opening of the rotation locking slot. In this way, during connection of the optical fiber sub-assembly and the adapter, to help align the notch of the protection tube with the separating rib of the annular slot, and at the same time align the connecting key on the locking cap with the opening of the rotation locking slot in the adapter.

In a possible implementation of the third aspect, a rotation-limiting structure is disposed between the locking cap and the protection tube, and the rotation-limiting structure is used to limit a rotation angle of the locking cap with respect to the connector component.

DESCRIPTION OF EMBODIMENTS

Figure 1:
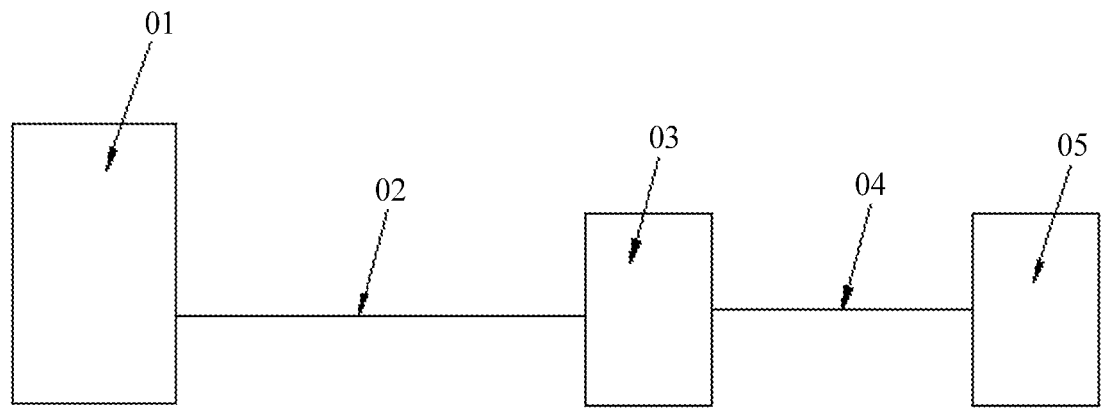
FIG. 1 is a schematic structural diagram of an FTTH network.

FIG. 1 is a schematic structural diagram of an FTTH network. The FTTH network includes a central office (CO) 01, a connectorized fiber distribution point (CFDP) 03, and a customer splicing point (CSP) 05. The central office 01 is connected to the connectorized fiber distribution point 03 using an optical distribution cable 02. The connectorized fiber distribution point 03 is connected to the customer splicing point 05 using an optical drop cable 04. An optical fiber connector provided in the embodiments of this application is applicable to a connection between the optical drop cable 04 and the connectorized fiber distribution point 03. It should be noted that this application is described using the FTTH network as an example. The solution in this application may also be used in other types of optical communications networks.

Figure 2:
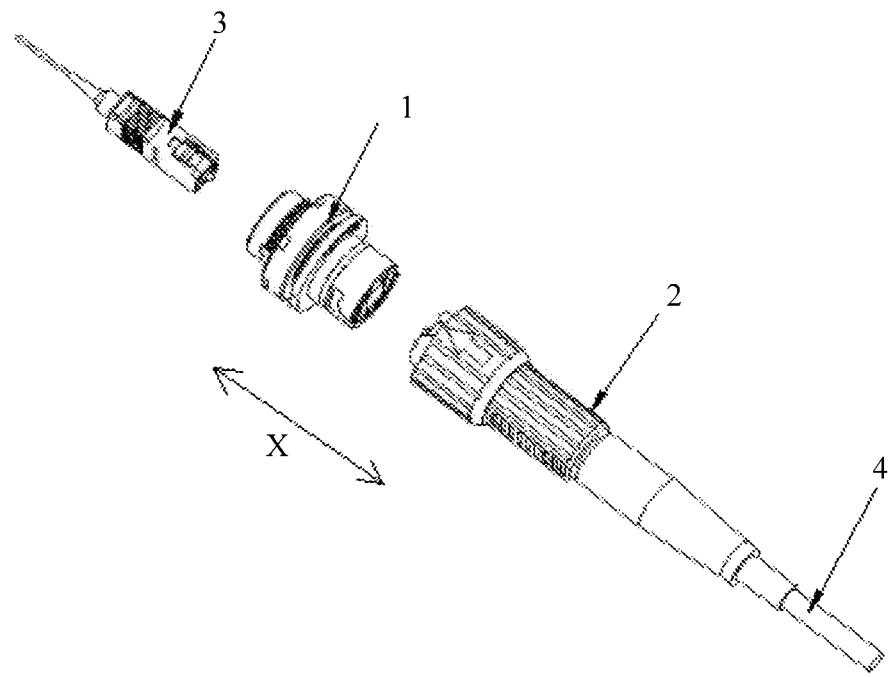
FIG. 2 is a schematic structural diagram of an optical fiber connector according to an embodiment of this application.
Figure 3:
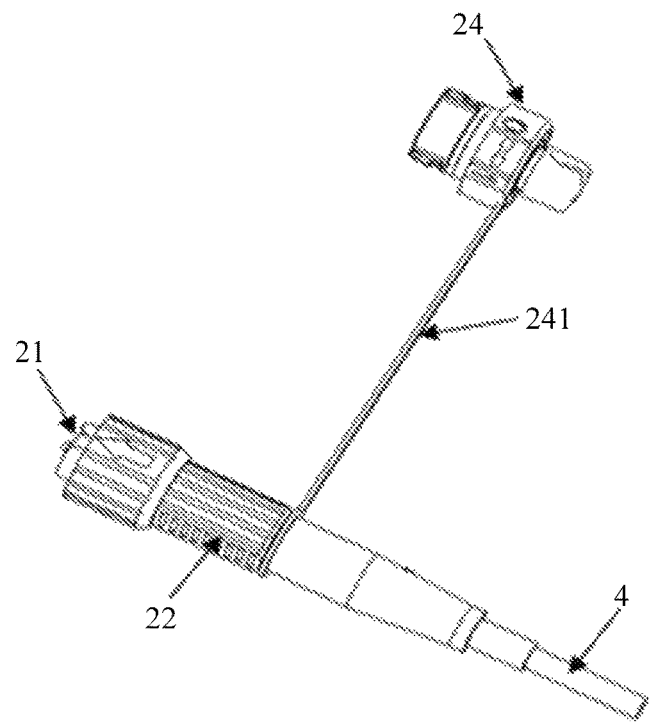
FIG. 3 is a schematic structural diagram of an optical fiber sub-assembly according to an embodiment of this application.
Figure 4:
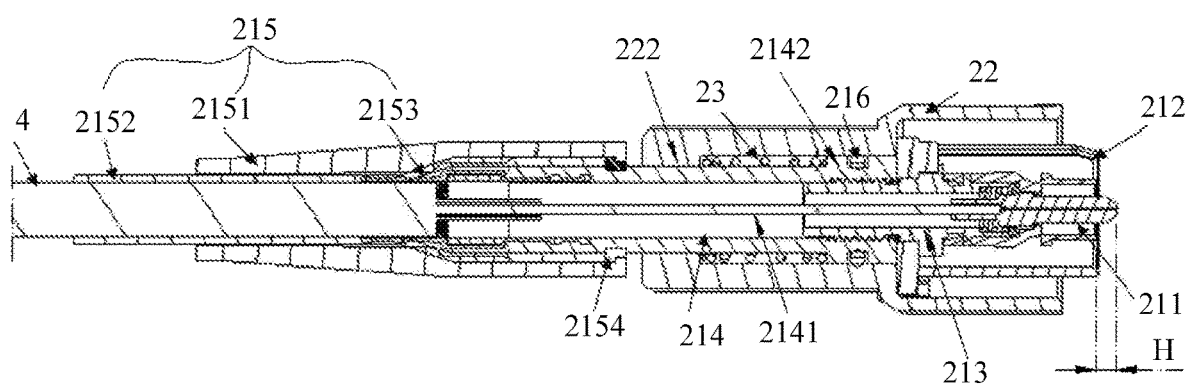
FIG. 4 is a schematic structural sectional view of an optical fiber sub-assembly according to an embodiment of this application.
Figure 6:
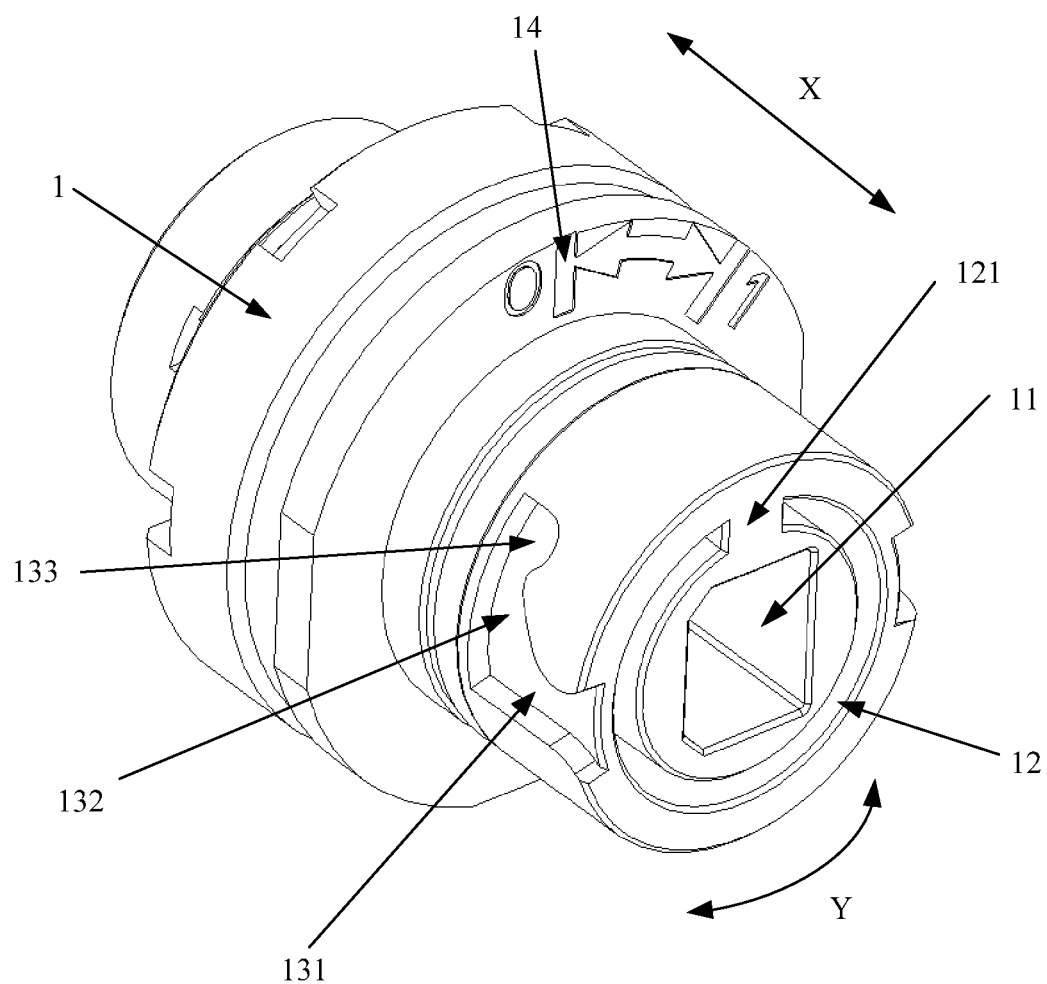
FIG. 6 is a schematic structural diagram of an adapter according to an embodiment of this application.

According to a first aspect, as shown in FIG. 2, an embodiment of this application provides an optical fiber connector, including an adapter 1, an optical fiber sub-assembly 2, an optical fiber sub-assembly 3, and an optical cable 4. A structure of the optical fiber sub-assembly 2 is shown in FIG. 3 and FIG. 4. The optical fiber sub-assembly 2 includes a connector component 21. A first end of the connector component 21 is used to connect the optical cable 4. A ferrule 211 is disposed at a second end of the connector component 21. A protection tube 212 is disposed around the ferrule 211. An end surface of the ferrule 211 protrudes from an end surface of the protection tube 212 or an end surface of the ferrule 211 is level with an end surface of the protection tube 212. A structure of the adapter 1 is shown in FIG. 6, a jack 11 and an annular slot 12 around the jack 11 are disposed at a first end of the adapter 1. A second end of the adapter 1 is used to insert the optical fiber sub-assembly 3. When the optical fiber sub-assembly 2 and the adapter 1 are interconnected, the ferrule 211 of the optical fiber sub-assembly 2 is inserted into the jack 11 of the adapter 1, and the protection tube 212 of the optical fiber sub-assembly 2 is correspondingly inserted into the annular slot 12.

For the optical fiber connector provided in this embodiment of this application, the end surface of the ferrule 211 protrudes from the end surface of the protection tube 212 or the end surface of the ferrule 211 is level with the end surface of the protection tube 212 in the optical fiber sub-assembly 2. Therefore, during connection of the optical fiber sub-assembly 2 and the adapter 1, a position of the ferrule 211 is visible to an operator, to help align the ferrule 211 with the jack 11 of the adapter 1. As a result, an insertion success rate is higher, the ferrule 211 is protected from repeated impact due to incorrect insertion, and the ferrule 211 is protected from damages. In addition, during routine use of the optical fiber sub-assembly 2, the ferrule 211 needs to be regularly or irregularly cleaned. The end surface of the ferrule 211 protrudes from the end surface of the protection tube 212 or the end surface of the ferrule 211 is level with the end surface of the protection tube 212, thereby further facilitating an operation of cleaning the ferrule 211.

In a possible implementation, a height difference H between the end surface of the ferrule 211 and the end surface of the protection tube 212 may be between 0 mm and 0.5 mm. The height difference H within the foregoing range helps an operator to see the position of the ferrule 211, and also helps protect the ferrule effectively.

Figure 5:
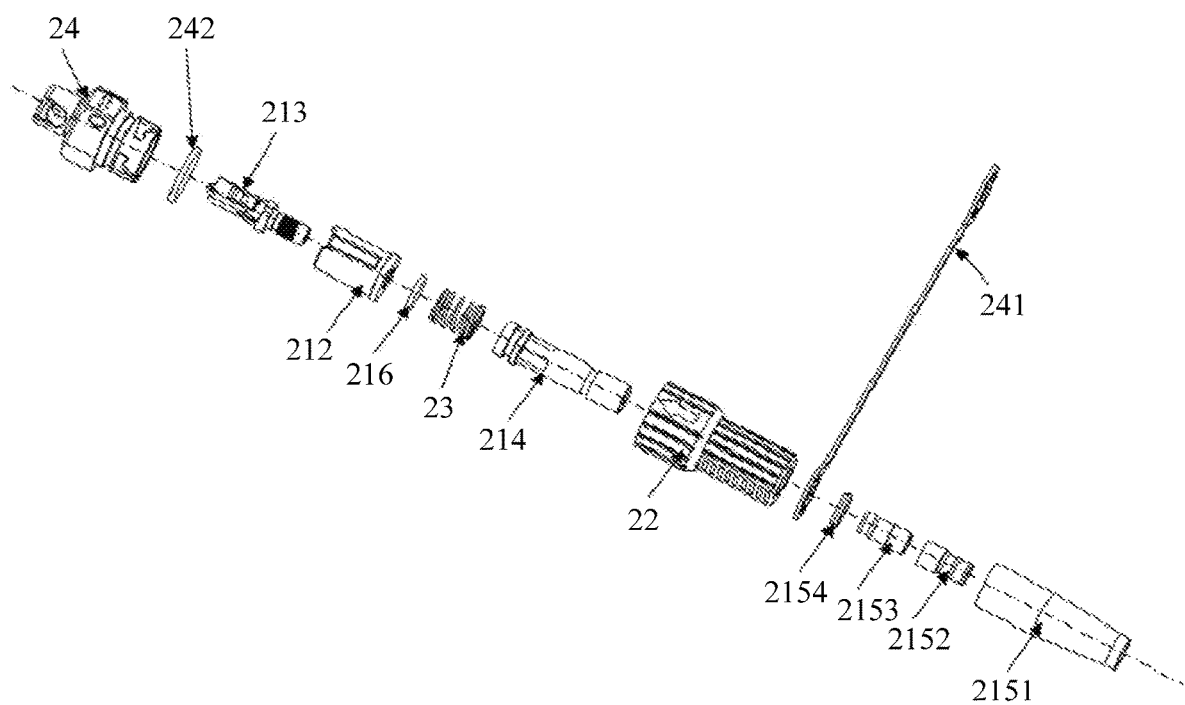
FIG. 5 is a schematic structural exploded view of an optical fiber sub-assembly according to an embodiment of this application.

To effectively protect a connection part between the optical fiber sub-assembly 2 and the adapter 1 to meet the IP68 protection level, as shown in FIG. 3, FIG. 4, and FIG. 5, a locking cap 22 may be sleeved over the connector component 21. After the optical fiber sub-assembly 2 is inserted into the adapter 1, the locking cap 22 is connected to the adapter 1, such that the locking cap 22 is tightly wrapped around a connection position of the optical fiber sub-assembly 2 and the adapter 1. As such, the optical fiber connector is protected from damages caused by an external environment.

Figure 7:
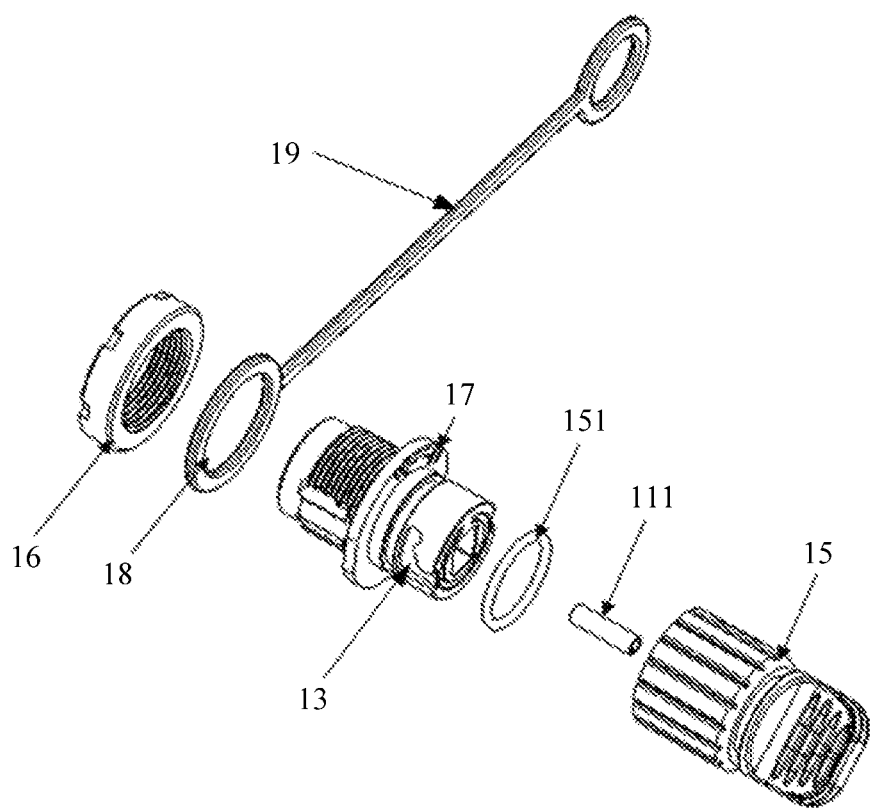
FIG. 7 is a schematic structural exploded view of an adapter according to an embodiment of this application.
Figure 8:
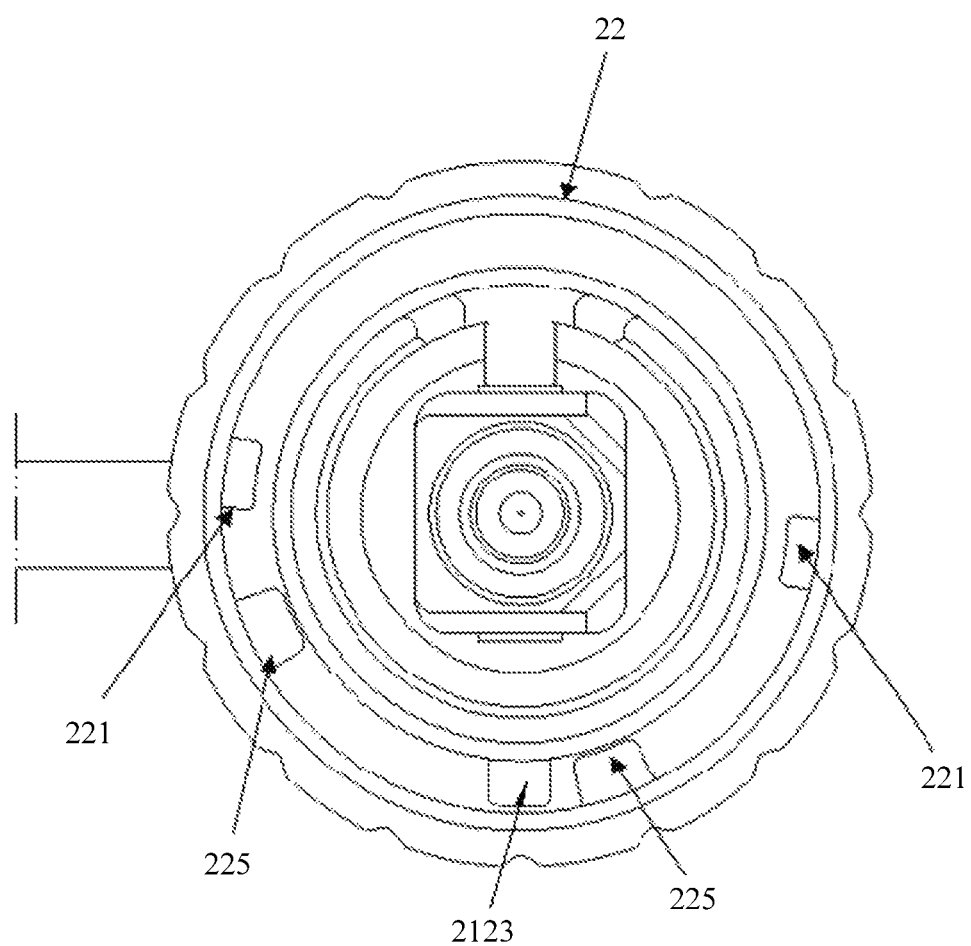
FIG. 8 is a schematic structural diagram of an end surface of an optical fiber sub-assembly according to an embodiment of this application.

The locking cap 22 and the adapter 1 may be connected in various manners. For example, the locking cap 22 and the adapter 1 may be connected through thread join. However, a thread connection manner requires repeated rotations for tightening and untightening, resulting in a troublesome and time-consuming operation. Moreover, thread tightening force that operators apply may be different, resulting in different tightening effects. In addition, long-time vibration may loosen the thread connection, to affect long-term reliability of a ferrule connecting member 213. Therefore, the locking cap 22 may be clamped at the adapter 1 using a clamp structure. For example, as shown in FIG. 6 and FIG. 7, a rotation locking slot 13 is provided in a side wall of the adapter 1. The rotation locking slot 13 includes an axial section 131 extending in an axial direction X and a circumferential section 132 extending in a circumferential direction Y. An opening is formed at an outer end of the axial section 131, an inner end of the axial section 131 is in communication with the circumferential section 132, and an extending portion 133 extending towards the first end of the adapter 1 is formed at one end of the circumferential section 132. The locking cap 22 can rotate with respect to the connector component 21. As shown in FIG. 8, a connecting key 221 is disposed on a wall of an inner hole of the locking cap 22. As shown in FIG. 4 and FIG. 5, a spring 23 is disposed between the connector component 21 and the locking cap 22. When the optical fiber sub-assembly 2 is inserted into the adapter 1 in the axial direction X, the locking cap 22 is sheathed over the adapter 1, and the connecting key 221 enters the axial section 131 from the opening at the outer end of the axial section 131. When the connecting key 221 is at the inner end of the axial section 131, rotating the locking cap 22 enables the connecting key 221 to enter the end of the circumferential section 132. In this case, an elastic force of the spring 23 may enable the locking cap 22 to move away from the adapter 1, such that the connecting key 221 is clamped at the extending portion 133 of the end of the circumferential section 132, to prevent the connecting key 221 from moving in a circumferential direction, and prevent the locking cap 22 from coming off the adapter 1.

In the foregoing embodiment, because the locking cap 22 is sleeved over the connector component 21, the locking cap 22 is clamped at the rotation locking slot 13 using the connecting key 221. During assembly of the optical fiber sub-assembly 2 and the adapter 1, after the ferrule 211 is inserted into the jack 11 of the adapter 1, the connecting key 221 merely needs to be rotated into an end extension portion 133 of the rotation locking slot 13, in a time-saving and labor-saving manner due to no repeated rotation. Moreover, because the spring 23 is disposed between the connector component 21 and the locking cap 22, under the elastic force of the spring 23, the connecting key 221 can be tightly clamped at the end extension portion 133 of the rotation locking slot 13. In this way, the optical fiber sub-assembly 2 and the adapter 1 do not get loosened even under long-time vibration, ensuring long-term reliability of the optical fiber connector.

As shown in FIG. 8, there may be two connecting keys 221. Correspondingly, there may be two rotation locking slots 13. The two connecting keys 221 and the two rotation locking slots 13 are clamped in a one-to-one correspondence manner. In this way, a locking force can be distributed more uniformly, to prevent the optical fiber sub-assembly 2 from coming off the adapter 1. As allowed by an arrangement space, there may be more than two connecting keys 221 and more than two rotation locking slots 13. For example, there are three or four connecting keys 221, and there are three or four rotation locking slots 13. This is not limited herein.

Figure 9:
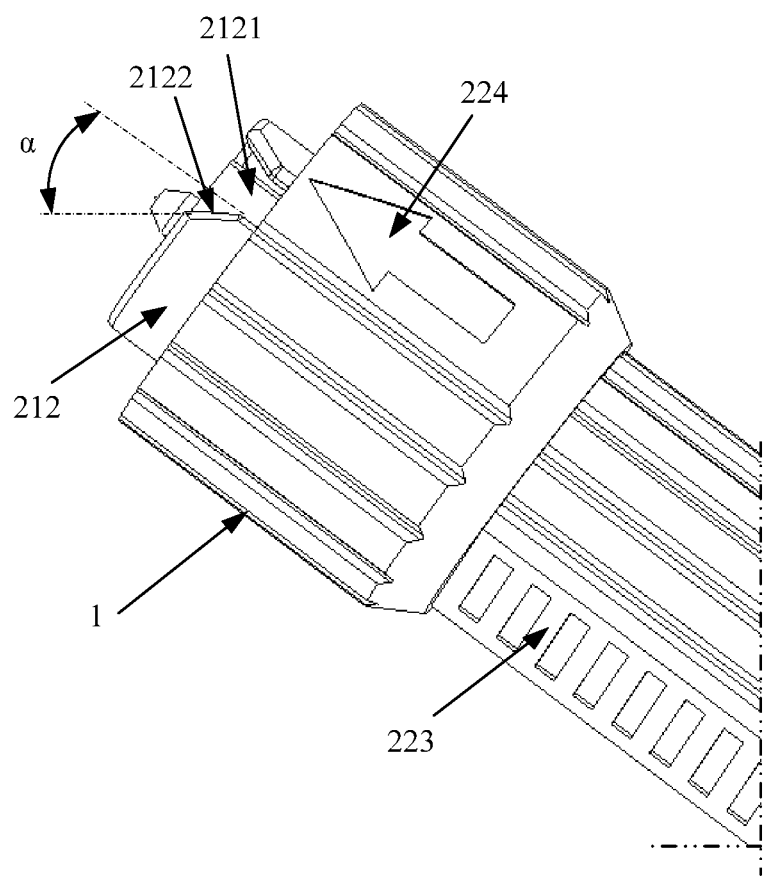
FIG. 9 is a partial schematic structural diagram of an optical fiber sub-assembly according to an embodiment of this application.

To prevent the connector component 21 from rotating with respect to the adapter 1, as shown in FIG. 9, a notch 2121 may be provided in the protection tube 212, to make the protection tube 212 a non-closed structure. Correspondingly, as shown in FIG. 6, a separating rib 121 may be formed at a position, corresponding to the notch 2121, in the annular slot 12. When the protection tube 212 is inserted into the annular slot 12, the separating rib 121 is correspondingly inserted into the notch 2121. In this way, the separating rib 121 may prevent the protection tube 212 from rotating, to prevent the connector component 21 from rotating with respect to the adapter 1.

As shown in FIG. 9, to help align the separating rib 121 with the notch 2121, a beveled edge 2122 may be formed at an outer end of the notch 2121, such that the notch 2121 forms a shape of a horn flare. In this way, even if the separating rib 121 is not aligned with the center of the notch 2121, the separating rib 121 can be guided by the beveled edge 2122 to slide into the notch 2121. When an operator connects the adapter 1 to the optical fiber sub-assembly 2, visibility of the position of the ferrule 211 helps align the ferrule 211 with the jack 11. In addition, a guiding effect of the beveled edge 2122 may enable the notch 2121 of the protection tube 212 to be aligned with the separating rib 121, thereby further improving insertion efficiency and an insertion success rate, and effectively protecting a plug from damages.

For example, as shown in FIG. 9, the beveled edge 2122 may be a chamfered edge. A structure of the chamfered edge is more convenient for processing. An opening at an outer end of the horn flare may be set to be relatively large, to have a relatively large guiding range. As shown in FIG. 9, an inclination angle α of a single-sided beveled edge 2122 may be set to be greater than or equal to 0° and less than or equal to 30°. For example, the inclination angle α of the single-sided beveled edge 2122 may be set to 10°, 12°, 15°, 30°, or the like. The angle of α may be adjusted according to an actual requirement. This is not limited herein. In addition, the beveled edge 2122 may be a filleted edge. The filleted edge has a smoother surface without a sharp side, such that the separating rib can be protected from wear.

For example, as shown in FIG. 4 and FIG. 5, the connector component 21 includes the ferrule connecting member 213, a connecting shaft 214, and an optical cable fixing apparatus 215. The ferrule 211 is disposed at one end of the ferrule connecting member 213. The other end of the ferrule connecting member 213 is connected to the connecting shaft 214. The connecting shaft 214 and the ferrule connecting member 213 may be connected through a thread. One end, away from the ferrule connecting member 213, of the connecting shaft 214 is connected to the optical cable fixing apparatus 215. The optical cable fixing apparatus 215 is used to fix the optical cable 4. A through hole 2141 extending in an axial direction is provided in the connecting shaft 214. The through hole 2141 is used for a cable core of the optical cable 4 to pass through. The cable core passing through the through hole is connected to the ferrule 211. As shown in FIG. 7, a ceramic tube 111 is disposed in the jack 11 of the adapter 1. When the optical fiber sub-assembly 2 and the adapter 1 are interconnected, the ferrule connecting member 213 fits the jack 11, and the ferrule 211 fits the ceramic tube 111.

A disposition position of the spring 23 may be shown in FIG. 4. The locking cap 22 is sleeved over the connecting shaft 214, an axial shoulder 2142 is formed on an outer wall of the connecting shaft 214, a boss 222 is formed on an inner wall of the locking cap 22, one end of the spring 23 abuts against the axial shoulder 2142, and the other end of the spring 23 abuts against the boss 222. In this case, when the locking cap 22 is pushed towards the adapter 1, the spring 23 is compressed. When the connecting key 221 is located at the end of the circumferential section 132, the locking cap 22 is released, and the locking cap 22 may move away from the adapter 1 under a restoring force of the spring 23, to enable the connecting key 221 to be clamped at the extending portion 133 at one end of the circumferential section 132. In this case, the connecting key 221 is in a tightly compressed state for a long time under the elastic force of the spring. In the structure, the spring 23 may be positioned and installed without using an additional component, such that an assembly operation is convenient.

To facilitate holding when the locking cap 22 is operated to rotate, as shown in FIG. 9, symmetrical flattened planes 223 may be formed on side walls of the locking cap 22. In this way, when the locking cap 22 is operated to rotate, the two flattened planes 223 may be held to perform a rotation operation, to prevent slips. To further increase friction, anti-slip grooves may be further formed on the flattened plane 223, and the hand feel can be improved during operation. It should be noted that there may be a plurality of pairs, for example, two or three pairs of symmetrical flattened planes 223. This is not limited herein.

As shown in FIG. 4 and FIG. 5, the optical cable fixing apparatus 215 includes a rear retainer 2151, a heat shrink tubing 2152, and a crimping structure 2153. The heat shrink tubing 2152 is sleeved over the optical cable 4, and the crimping structure 2153 is used to rivet an aramid yarn layer of the optical cable 4 and the connecting shaft 214 together, to increase tensile strength of the optical fiber sub-assembly 2. The rear retainer 2151 is sleeved over the heat shrink tubing 2152 and is connected to the end, away from the ferrule connecting member 213, of the connecting shaft 214. In this way, the optical cable 4 at a tail end of the optical fiber sub-assembly 2 may be effectively fixed. The rear retainer 2151 may be first fabricated and eventually sleeved, or may be eventually cast in an overall injection molding manner, to further increase tensile strength and sealing performance of the optical fiber sub-assembly 2. To limit the rear retainer 2151, a locating slot may be provided in a side wall of the connecting shaft 214, where a snap ring 2154 is disposed in the locating slot, and the rear retainer 2151 is clamped to the snap ring 2154. In this way, the rear retainer 2151 can be prevented from moving in an axial direction.

During connection of the optical fiber sub-assembly 2 and the adapter 1, the notch 2121 of the protection tube 212 needs to be aligned with the separating rib 121 of the annular slot 12, and the connecting key 221 on the locking cap 22 needs to be aligned with the opening of the rotation locking slot 13 on the adapter 1. Relative positions of the separating rib 121 on the adapter 1 and the opening of the rotation locking slot 13 are fixed, and the locking cap 22 may rotate with respect to the connector component 21. Therefore, the relative positions of the notch 2121 of the protection tube 212 and the connecting key 221 on the locking cap 22 are not fixed. To facilitate an alignment operation, as shown in FIG. 9, an indication mark 224 may be disposed on an outer wall of the locking cap 22. The indication mark 224 may be an arrow, an indication line or the like. A position of the indication mark 224 may be set, such that when the indication mark 224 is aligned with the notch 2121 of the protection tube 212, the relative positions of the notch 2121 of the protection tube 212 and the connecting key 221 on the locking cap 22 adapt to the relative positions of the separating rib 121 on the adapter 1 and the opening of the rotation locking slot 13. In this case, it is only necessary to align the notch 2121 of the protection tube 212 with the separating rib 121 of the annular slot 12. Accordingly the connecting key 221 on the locking cap 22 is naturally aligned with the opening of the rotation locking slot 13 on the adapter 1.

Correspondingly, to conveniently indicate whether the optical fiber sub-assembly 2 and the adapter 1 are in a locked state or a loose state, as shown in FIG. 6, a state indication symbol 14 may be disposed on the adapter 1. The state indication symbol 14 may include a symbol "0" and a symbol "1". The symbol "0" represents that the optical fiber sub-assembly 2 and the adapter 1 are in a loose state. The symbol "1" represents that the optical fiber sub-assembly 2 and the adapter 1 are in a locked state. In this way, when the indication mark 224 on the locking cap 22 points at the symbol "0", the connecting key 221 is at a starting end of the circumferential section 132 of the rotation locking slot 13, the optical fiber sub-assembly 2 and the adapter 1 are in a loose state, and the optical fiber sub-assembly 2 and the adapter 1 may move in the axial direction X to separate. When the indication mark 224 on the locking cap 22 points at the symbol "1", the connecting key 221 is at the end extension portion 133 of the circumferential section 132 of the rotation locking slot 13, the optical fiber sub-assembly 2 and the adapter 1 are in a locked state, and the optical fiber sub-assembly 2 and the adapter 1 cannot move in the axial direction X to separate.

To prevent the indication mark 224 from deviating far away from the notch 2121 of the protection tube 212 when the locking cap 22 rotates, a rotation-limiting structure may be disposed between the locking cap 22 and the protection tube 212. The rotation-limiting structure is used to limit a rotation angle of the locking cap 22 with respect to the connector component 21, such that the rotation angle of the locking cap 22 adapts to a rotation angle required for the connecting key 221 to be rotated into one end of the rotation locking slot 13 from the opening of the rotation locking slot 13. For example, as shown in FIG. 8, the rotation-limiting structure includes two first limiting bumps 225 disposed at an interval on the inner wall of the locking cap 22 and a second limiting bump 2123 disposed on the protection tube 212. The second limiting bump 2123 is located between the two first limiting bumps 225. In this way, the rotation angle of the locking cap 22 may be restricted in a relatively small range, such that the indication mark 224 does not deviate far away from the notch 2121 of the protection tube 212, to facilitate an alignment operation.

To prevent external foreign objects such as moisture and dust from entering the optical fiber connector, as shown in FIG. 4 and FIG. 5, a sealing ring 216 may be disposed at a connection between the locking cap 22 and the connecting shaft 214. Thus, the sealing ring 216 may prevent foreign objects such as moisture and dust from entering the optical fiber connector through the connection between the locking cap 22 and the connecting shaft 214 and then reaching IP68 protection level.

Figure 10:
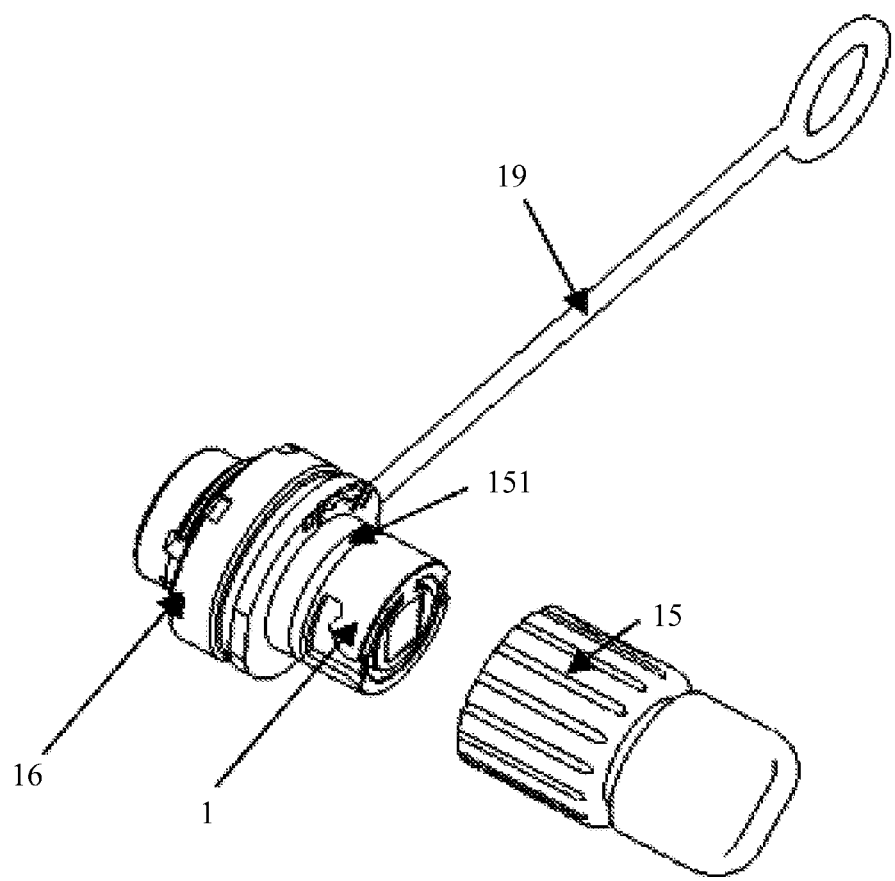
FIG. 10 is a schematic structural exploded view of an adapter and a second dust-proof cap according to an embodiment of this application.

The second end of the connector component 21 and the first end of the adapter 1 are in an open state before being connected. In this case, to prevent foreign objects such as dust from entering the connector component 21 and the adapter 1, as shown in FIG. 3 and FIG. 5, a first dust-proof cap 24 may be detachably connected at the second end of the connector component 21. To prevent the first dust-proof cap 24 from missing, the first dust-proof cap 24 may be connected to the rear retainer 2151 through a string 241. To enable the first dust-proof cap 24 to form a desirable sealing effect when the first dust-proof cap 24 is closed, a sealing ring 242 may be disposed between the first dust-proof cap 24 and the locking cap 22. In this way, before the optical fiber sub-assembly 2 is inserted into the adapter 1, dustproofness and waterproofness can be provided, and the ferrule 211 can be protected. As shown in FIG. 7, a second dust-proof cap 15 is detachably connected to the first end of the adapter 1. In this way, before the optical fiber sub-assembly 2 is inserted into the adapter 1, dustproofness and waterproofness can be provided, and the ceramic tube 111 in the adapter 1 can be protected. When the adapter 1 and the optical fiber sub-assembly 2 need to be connected, it is only necessary to detach the first dust-proof cap 24 and the second dust-proof cap 15. As shown in FIG. 10, to enable the second dust-proof cap 15 to form a desirable sealing effect when being closed, a sealing ring 151 is further disposed on the adapter 1.

Because the adapter 1 is usually installed on a housing wall of a device, as shown in FIG. 7, a nut 16 is connected at the second end of the adapter 1 through a thread, a flange 17 is disposed on the side wall of the adapter 1, a sealing pad 18 is disposed between the flange 17 and the nut 16. During assembly of the adapter 1, the nut 16 may be first detached, the second end of the adapter 1 is then passed through an assembly hole in the housing wall of the device, and the nut 16 is eventually screwed into the second end of the adapter 1 from the other side of the housing wall of the device. In this case, the sealing pad 18 is located between the flange 17 and the housing wall of the device to seal the assembly hole in the housing wall. To prevent the second dust-proof cap 15 from missing, as shown in FIG. 7, the sealing pad 18 may be connected to the second dust-proof cap 15 through a string 19, where the sealing pad 18, the second dust-proof cap 15, and the string 19 may be integrally made of the same material (for example, a rubber material).

According to a second aspect, an embodiment of this application further provides an optical fiber sub-assembly. For related technical features thereof, refer to the description of features related to the optical fiber sub-assembly in the foregoing optical fiber connector embodiment. Details are not described herein again.

According to a third aspect, an embodiment of this application further provides an adapter. For related technical features thereof, refer to the description of features related to the adapter in the foregoing optical fiber connector embodiment. Details are not described herein again.

In the descriptions of this specification, the described features, structures, materials, or characteristics may be combined in a proper manner in any one or more of the embodiments or examples.

The foregoing descriptions are merely example implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:
1. An optical fiber sub-assembly, comprising:
a connector component, wherein a first end of the connector component is to connect an optical cable;
a ferrule disposed at a second end of the connector component; and
a protection tube disposed around the ferrule, wherein an end surface of the ferrule protrudes from or is level with an end surface of the protection tube,
wherein the connector component comprises:
a ferrule connecting member, wherein the ferrule is disposed at one end of the ferrule connecting member;
a connecting shaft connected to another end of the ferrule connecting member, wherein the connecting shaft includes a through hole extending in an axial direction, wherein the through hole is for a cable core of the optical cable to pass through to connect to the ferrule at the ferrule connecting member; and
an optical cable fixing apparatus connected to a first end, away from the ferrule connecting member, of the connecting shaft, wherein the optical cable fixing apparatus is configured to fix the optical cable, wherein the optical cable fixing apparatus comprises a rear retainer, a heat shrink tubing, and a crimping structure, wherein the heat shrink tubing is sleeved over the optical cable, wherein the crimping structure is configured to rivet an aramid yarn layer of the optical cable and the connecting shaft together, and wherein the rear retainer is sleeved over the heat shrink tubing and is connected to the first end of the connecting shaft.

2. The optical fiber sub-assembly according to claim 1, further comprising a locking cap sleeved over the connector component.

3. The optical fiber sub-assembly according to claim 2, wherein the locking cap is configured to rotate with respect to the connector component.

4. The optical fiber sub-assembly according to claim 2, further comprising a connecting key disposed on a wall of an inner hole of the locking cap.

5. The optical fiber sub-assembly according to claim 4, further comprising a spring disposed between the connector component and the locking cap.

6. The optical fiber sub-assembly according to claim 5, wherein an axial shoulder is formed on an outer wall of the connecting shaft.

7. The optical fiber sub-assembly according to claim 6, wherein one end of the spring abuts against the axial shoulder.

8. The optical fiber sub-assembly according to claim 7, wherein another end of the spring abuts against a boss.

9. The optical fiber sub-assembly according to claim 8, wherein the boss is formed on an inner wall of the locking cap.

10. The optical fiber sub-assembly according to claim 2, wherein the locking cap is sleeved over the connecting shaft.

11. The optical fiber sub-assembly according to claim 10, further comprising a sealing ring disposed between the locking cap and the connecting shaft.

12. The optical fiber sub-assembly according to claim 1, further comprising a locating slot in a side wall of the connecting shaft.

13. The optical fiber sub-assembly according to claim 12, further comprising a snap ring.

14. The optical fiber sub-assembly according to claim 13, wherein the snap ring is disposed in the locating slot.

15. The optical fiber sub-assembly according to claim 14, wherein the rear retainer is clamped to the snap ring.

16. The optical fiber sub-assembly according to claim 1, further comprising a first dust-proof cap detachably connected to the second end of the connector component.

17. The optical fiber sub-assembly according to claim 1, wherein the protection tube has a notch.

18. The optical fiber sub-assembly according to claim 17, further comprising a beveled edge.

19. The optical fiber sub-assembly according to claim 18, wherein the beveled edge is formed at an outer end of the notch.

* * * * *